(12) United States Patent
Chang

(10) Patent No.: US 7,697,087 B2
(45) Date of Patent: Apr. 13, 2010

(54) DIRECT TYPE BACKLIGHT MODULE WITH PLATFORM SUPPORT FOR OPTICAL PLATE

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 448 days.

(21) Appl. No.: 11/617,046

(22) Filed: Dec. 28, 2006

(65) Prior Publication Data
US 2008/0089054 A1    Apr. 17, 2008

(30) Foreign Application Priority Data
Oct. 13, 2006   (CN) .......................... 200610063087

(51) Int. Cl.
G02F 1/1335   (2006.01)
G02F 1/1333   (2006.01)
G09F 13/08    (2006.01)

(52) U.S. Cl. .............................. 349/61; 349/64; 349/58; 362/97.2; 362/97.3

(58) Field of Classification Search ................... 349/64, 349/61; 362/97.3, 97.2, 632
See application file for complete search history.

(56) References Cited

U.S. PATENT DOCUMENTS 7,269,009 B2 *   9/2007   Ryu et al. .................... 361/692
7,324,174 B2 *   1/2008   Hafuka et al. ................. 349/61

* cited by examiner

Primary Examiner—David Nelms
Assistant Examiner—W. Patty Chen
(74) Attorney, Agent, or Firm—Clifford O. Chi (57) ABSTRACT

An exemplary backlight module (100) includes a housing (10), a reflective sheet (30), a number of point light sources (20). The housing includes a bottom plate (12) and at least one platform support (14) extending out from the bottom plate towards an interior of the housing. The reflective sheet is supported by the platform support, and defines a number of through holes (301). The point light sources are arranged in the housing corresponding to the through holes of the reflective sheet. Each point light source includes a base portion (22) and a light emitting portion (24). The base portion is secured at the bottom plate of the housing, and the light emitting portion protrudes through a corresponding one of the through holes.

9 Claims, 10 Drawing Sheets

DIRECT TYPE BACKLIGHT MODULE WITH PLATFORM SUPPORT FOR OPTICAL PLATE

BACKGROUND OF THE INVENTION

1. Field of the Invention

The present invention generally relates to a direct type backlight module with point light sources, the direct type backlight module typically being used in a liquid crystal display (LCD) device.

2. Discussion of the Related Art

Most liquid crystal display (LCD) devices are passive devices in which images are displayed by controlling an amount of light input from an outside light source. Thus, a separate artificial light source (for example, a backlight module) is generally employed for irradiating an LCD panel that has the LCD device.

Generally, backlight modules are classified as edge type or direct type, based upon the arrangement of one or more lamps thereof. The edge type backlight module has a lamp arranged at a side portion of a light guiding plate that is used for guiding light. The edge type backlight module is commonly employed in small-sized LCDs because it is lightweight, small, and has low power consumption. However, the edge type backlight module is generally not suitable for large-sized LCDs (20 inches or more). A direct type backlight module usually has a plurality of lamps arranged in a regular array. The lamps directly illuminate an entire major surface of a light guiding plate. The light passes directly through the light guiding plate to illuminate an LCD panel. Direct type backlight modules have a higher efficiency of utilization of light energy and a longer operational service life than edge type backlight modules, and are commonly produced for large-sized LCDs.

The lamps of the direct type backlight module can be selected from the group consisting of cold cathode fluorescent lamps (CCFLs) and light emitting diodes (LEDs). LEDs provide a purer color, have a lower operation voltage, and are lighter compared to CCFLs. Thus LEDs are more commonly used in direct type backlight modules.

Figure 10:
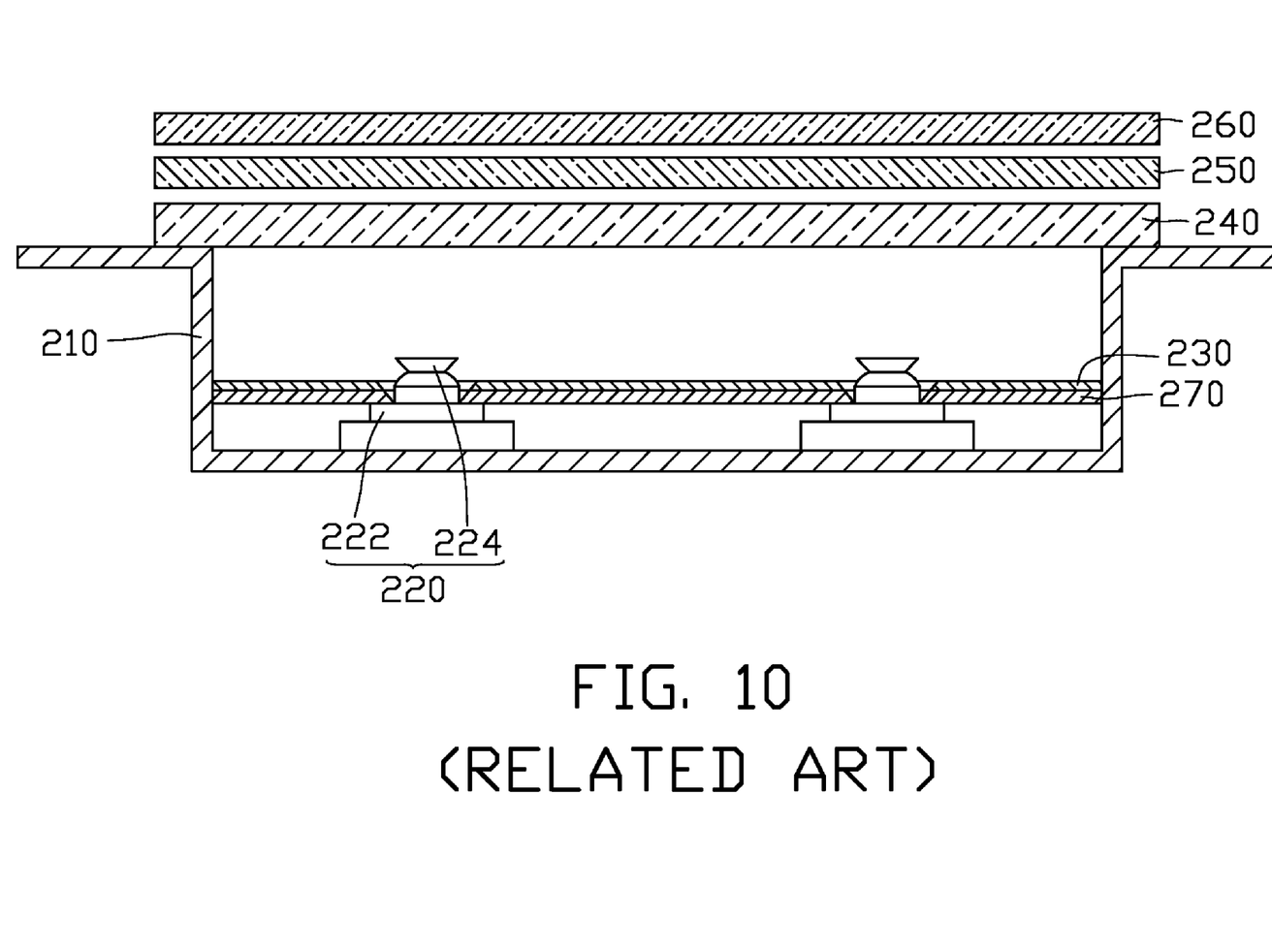
FIG. 10 is a side cross-sectional view of a conventional backlight module.

Referring to FIG. 10, a typical direct type backlight module is shown. The backlight module includes a housing 210, a plurality of LEDs 220 acting as light sources, a reflective sheet 230, a first optical sheet 240, a second optical sheet 250, and a third optical sheet 260. The LEDs 220 are arranged in the housing 210 at selected intervals. Each LED 220 includes a base portion 222 and a light emitting portion 224. The light emitting portion 224 is made of a plastic material. The first, second and third optical sheets 240, 250 and 260 can be selected from the group consisting of a diffusion panel, a diffusion sheet, and a prism sheet. The first, second and third optical sheets 240, 250 and 260 are arranged above the LEDs 220 in that order. The reflective sheet 230 defines a plurality of through holes (not labeled). The light emitting portions 224 of the LEDs 220 protrude through the corresponding through holes of the reflective sheet 230.

In the above-described backlight module, the reflective sheet 230 is substantially a plastic thin sheet. Thus, a metal sheet 270 is disposed beneath the reflective sheet 230 for supporting the reflective sheet 230. However, the metal sheet 270 increases a weight and a cost of the backlight module. In addition, the metal sheet 270 itself is thin and easily deformed. If the metal sheet 270 is accidentally bent, it is difficult to restore the metal sheet 270 to its original flatness. The deformed metal sheet 270 may displace the light emitting portions 224 of the LEDs 220, and may cause deformation of the reflective sheet 230. Either of these problems is liable to result in a lower efficiency of utilization of light emitted by the light emitting portions 224. Furthermore, in order that the metal sheet 270 can engage with the LEDs 220, a plurality of installation holes are defined in the metal sheet 270. When the metal sheet 270 is assembled in the backlight module, the light emitting portions 224 are liable to be damaged by the metal sheet 270 at the installation holes. This is because the light emitting portions 224 are made of plastic material.

Therefore, a new backlight module is desired in order to overcome the above-described shortcomings.

SUMMARY

A backlight module includes a housing, a reflective sheet, a number of point light sources. The housing includes a bottom plate and at least one platform support extending out from the bottom plate towards an interior of the housing. The reflective sheet is supported by the platform support, and defines a number of through holes. The point light sources are arranged in the housing corresponding to the through holes of the reflective sheet. Each point light source includes a base portion and a light emitting portion. The base portion is secured at the bottom plate of the housing, and the light emitting portion protrudes through a corresponding one of the through holes.

Other advantages and novel features will become more apparent from the following detailed description, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present backlight module. Moreover, in the drawings, like reference numerals designate corresponding parts throughout the several views, and all the views are schematic.

DETAILED DESCRIPTION OF THE EMBODIMENTS

Figure 1:
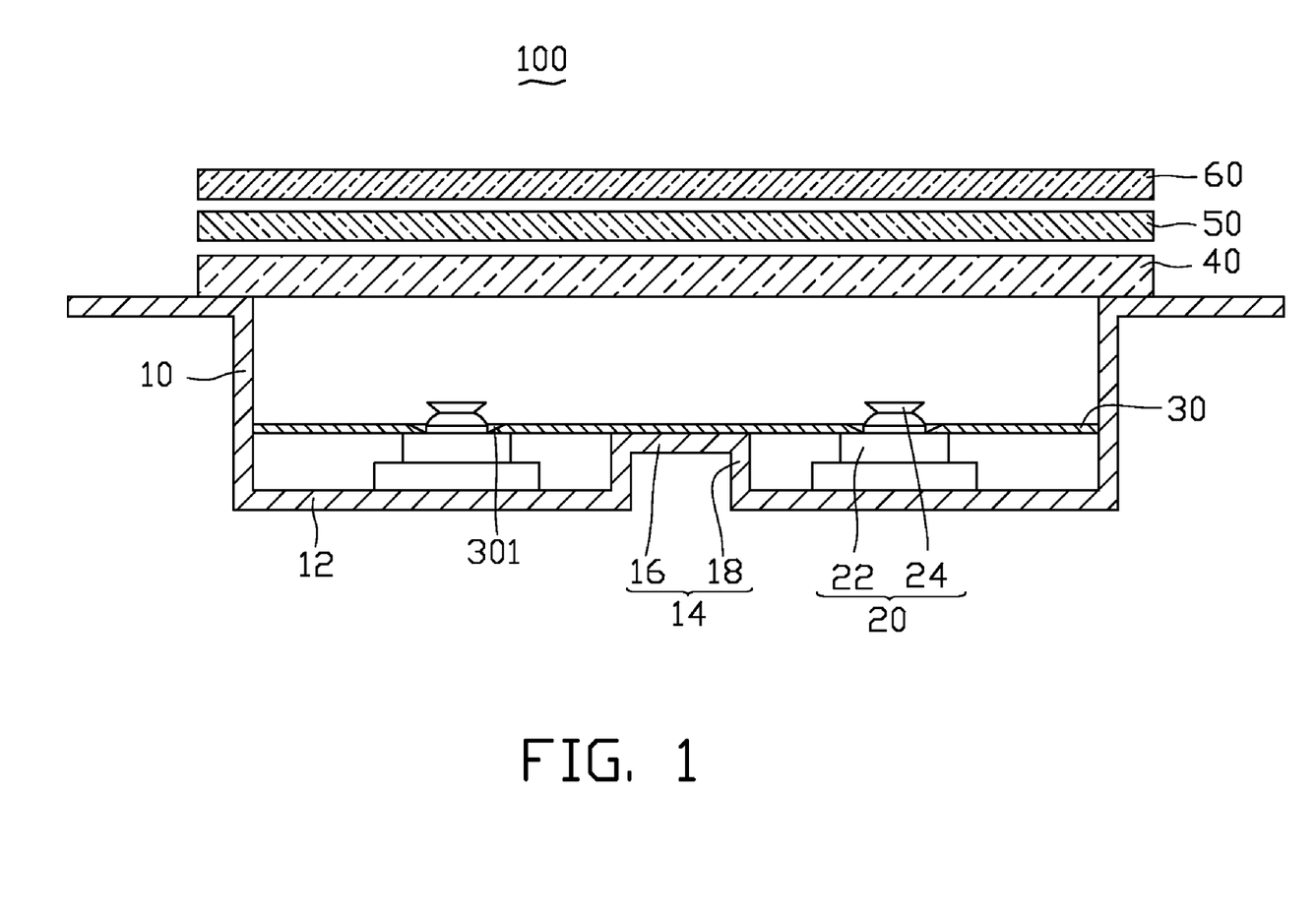
FIG. 1 is a side cross-sectional view of a backlight module in accordance with a first embodiment of the present invention.

Referring now to the drawings in detail, FIG. 1 shows a direct type backlight module 100 according to a first preferred embodiment of the present invention. The backlight module 100 includes a housing 10, a plurality of light sources 20, a reflective sheet 30, a first optical sheet 40, a second optical sheet 50, and a third optical sheet 60.

The housing 10 includes a bottom plate 12, and at least one platform support 14 extending from the bottom plate 12 towards an interior of the housing 10. In the illustrated embodiment, the housing 10 includes one platform support 14. The platform support 14 includes a ceiling 16 and two sidewalls 18. The ceiling 16 of the platform support 14 is configured for supporting the reflective sheet 30 that is disposed in the housing 10. Each of the sidewalls 18 connects with the bottom plate 12. The reflective sheet 30 defines a plurality of through holes 301 corresponding to the light sources 20. Each of the light sources 20 includes a base portion 22 and a light emitting portion 24. The base portions 22 are attached on the bottom plate 12 in a predetermined arrangement. The light emitting portions 24 of the light sources 20 can pass through the corresponding through holes 301 of the reflective sheet 30, with the platform support 14 supporting the reflective sheet 30. Each light source 20 is in general a point light source, for example a light-emitting diode (LED). In the illustrated embodiment, the light sources 20 are LEDs. The first, second and third optical sheets 40, 50 and 60 can be selected from the group consisting of a diffusion panel, a diffusion sheet, and a prism sheet. The first, second and third optical sheets 40, 50 and 60 are arranged above the light sources 20 in that order. In the first preferred embodiment, the first optical sheet 40 is a diffusion panel or a diffusion sheet.

When the backlight module 100 is in use, the light sources 20 generate light that radiates inside the housing 10. Some of the light directly enters an incident surface of the first optical sheet 40, and some of the light is first reflected off the reflective sheet 30 before entering the incident surface of the first optical sheet 40. The light is diffused by the first optical sheet 40, passes through the second optical sheet 50 and the third optical sheet 60, and finally emits from the backlight module 100 to illuminate an LCD panel (not shown).

Figure 2:
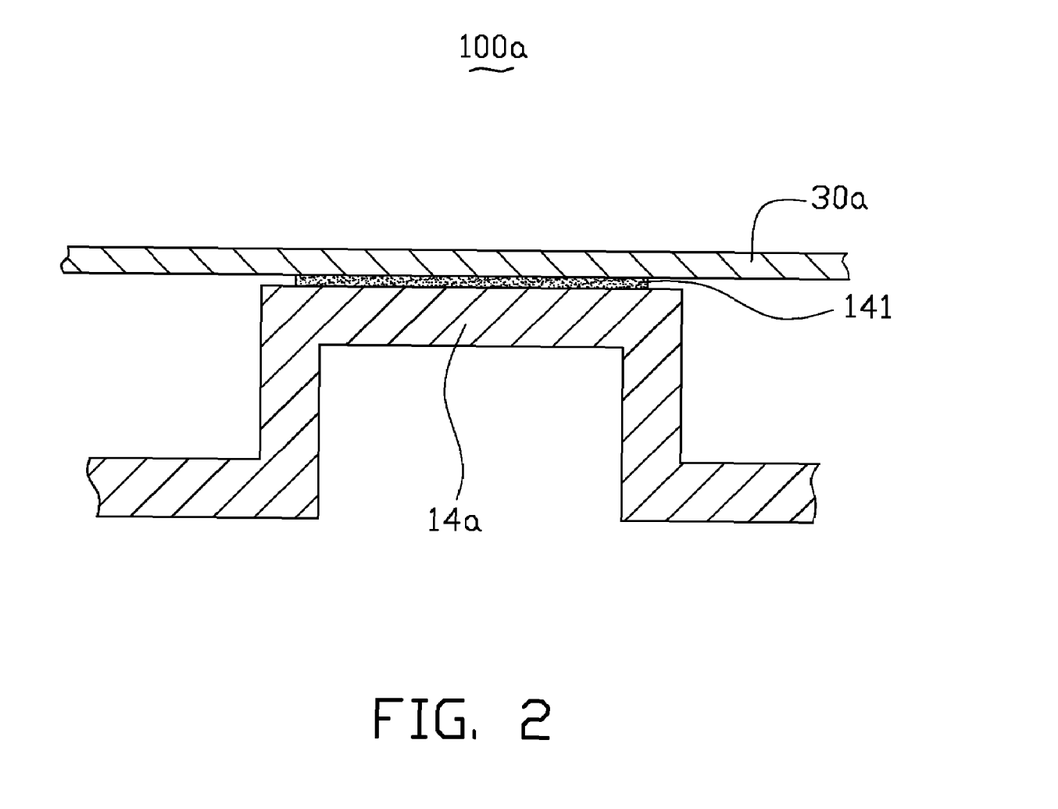
FIG. 2 is a side cross-sectional view of part of a backlight module in accordance with a second embodiment of the present invention.

Referring to FIG. 2, a backlight module 100a according to a second embodiment of the present invention is shown. The backlight module 100a includes a platform support 14a and a reflective sheet 30a. The platform support 14a is configured for supporting the reflective sheet 30a. The backlight module 100a is similar in principle to the backlight module 100 described above, except that the backlight module 100a further includes an adhesive member 141. The adhesive member 141 can be selected from the group consisting of a piece of double-sided adhesive tape, solid adhesive, and glue. In the illustrated embodiment, the adhesive member 141 is a piece of double-sided adhesive tape. The reflective sheet 30a is secured with the platform support 14a by using the adhesive member 141.

Figure 3:
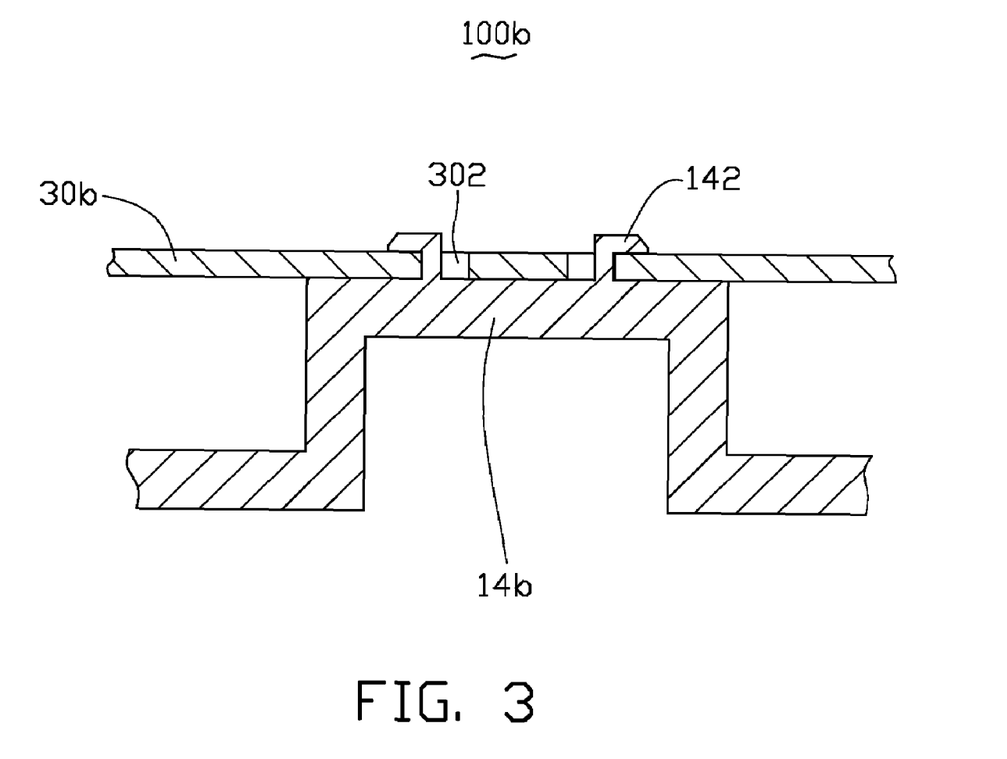
FIG. 3 is a side cross-sectional view of part of a backlight module in accordance with a third embodiment of the present invention.

Referring to FIG. 3, a backlight module 100b according to a third embodiment of the present invention is shown. The backlight module 100b includes a platform support 14b and a reflective sheet 30b. The platform support 14b is configured for supporting the reflective sheet 30b. The backlight module 100b is similar in principle to the backlight module 100 described above, except that the platform support 14b of the backlight module 100b includes at least one hook 142, and the reflective sheet 30b defines at least one hook hole 302. In the illustrated embodiment, there are a plurality of hooks 142, and a corresponding plurality of the hook holes 302. In particular, the platform support 14b includes two hooks 142, and the reflective sheet 30b defines two hook holes 302. The hooks 142 pass through the corresponding hook holes 302 to securely latch the reflective sheet 30b with the platform support 14b.

Figure 4:
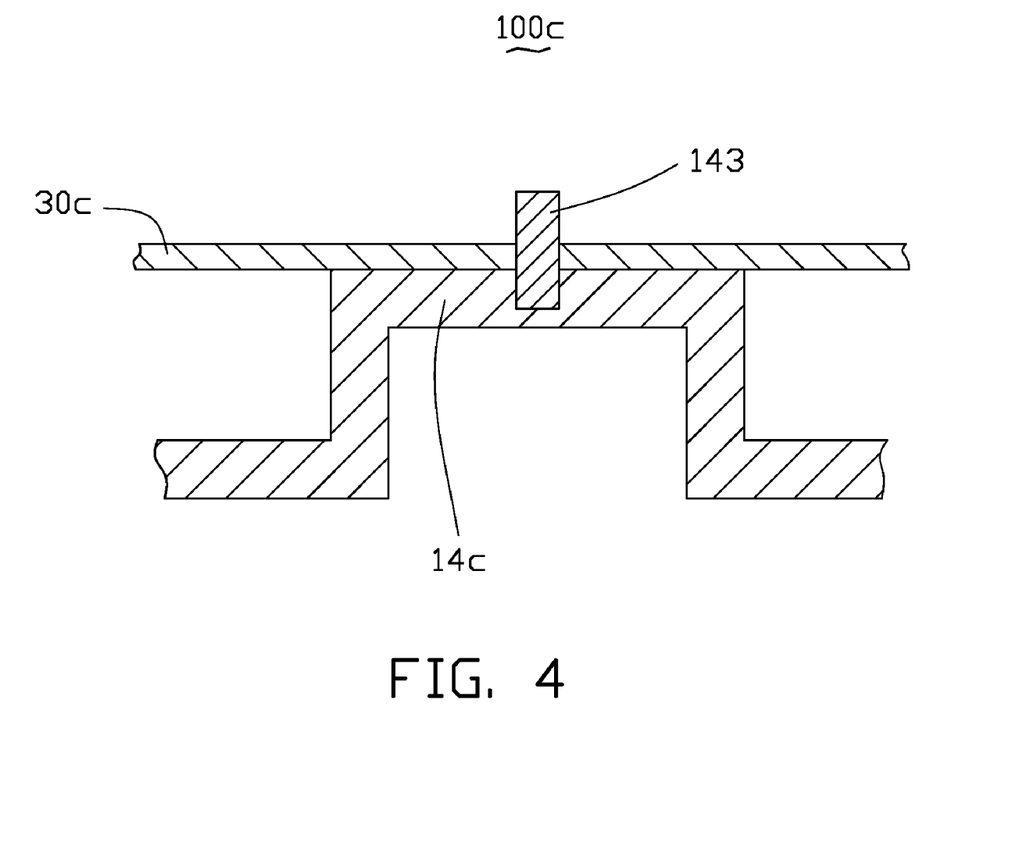
FIG. 4 is a side cross-sectional view of part of a backlight module in accordance with a fourth embodiment of the present invention.

Referring to FIG. 4, a backlight module 100c according to a fourth embodiment of the present invention is shown. The backlight module 100c includes a platform support 14c and a reflective sheet 30c. The platform support 14c is configured for supporting the reflective sheet 30c. The backlight module 100c is similar in principle to the backlight module 100 described above, except that the backlight module 100c further includes a pin 143, and the platform support 14c and the reflective sheet 30c each define a pin hole (not labeled). The pin 143 is engaged in the pin holes of the reflective sheet 30c and the platform support 14c to correctly position and secure the reflective sheet 30c relative to the platform support 14c.

Figure 5:
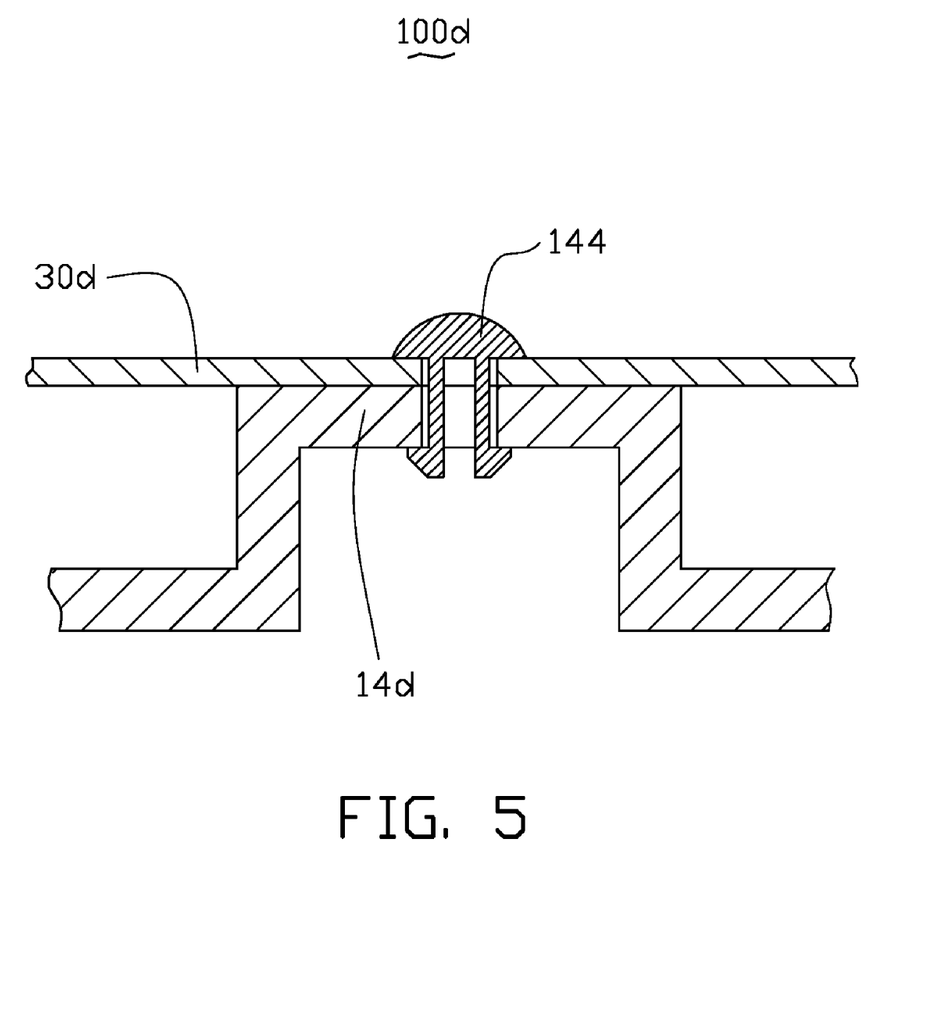
FIG. 5 is a side cross-sectional view of part of a backlight module in accordance with a fifth embodiment of the present invention.

Referring to FIG. 5, a backlight module 100d according to a fifth embodiment of the present invention is shown. The backlight module 100d includes a platform support 14d and a reflective sheet 30d. The platform support 14d is configured for supporting the reflective sheet 30d. The backlight module 100d is similar in principle to the backlight module 100 described above, except that the backlight module 100d further includes a fastener 144, and the platform support 14d and the reflective sheet 30d each define a pair of fastener holes (not labeled). The fastener 144 is engaged in the fastener holes of the reflective sheet 30d and the platform support 14d to secure the reflective sheet 30d with the platform support 14d.

Figure 6:
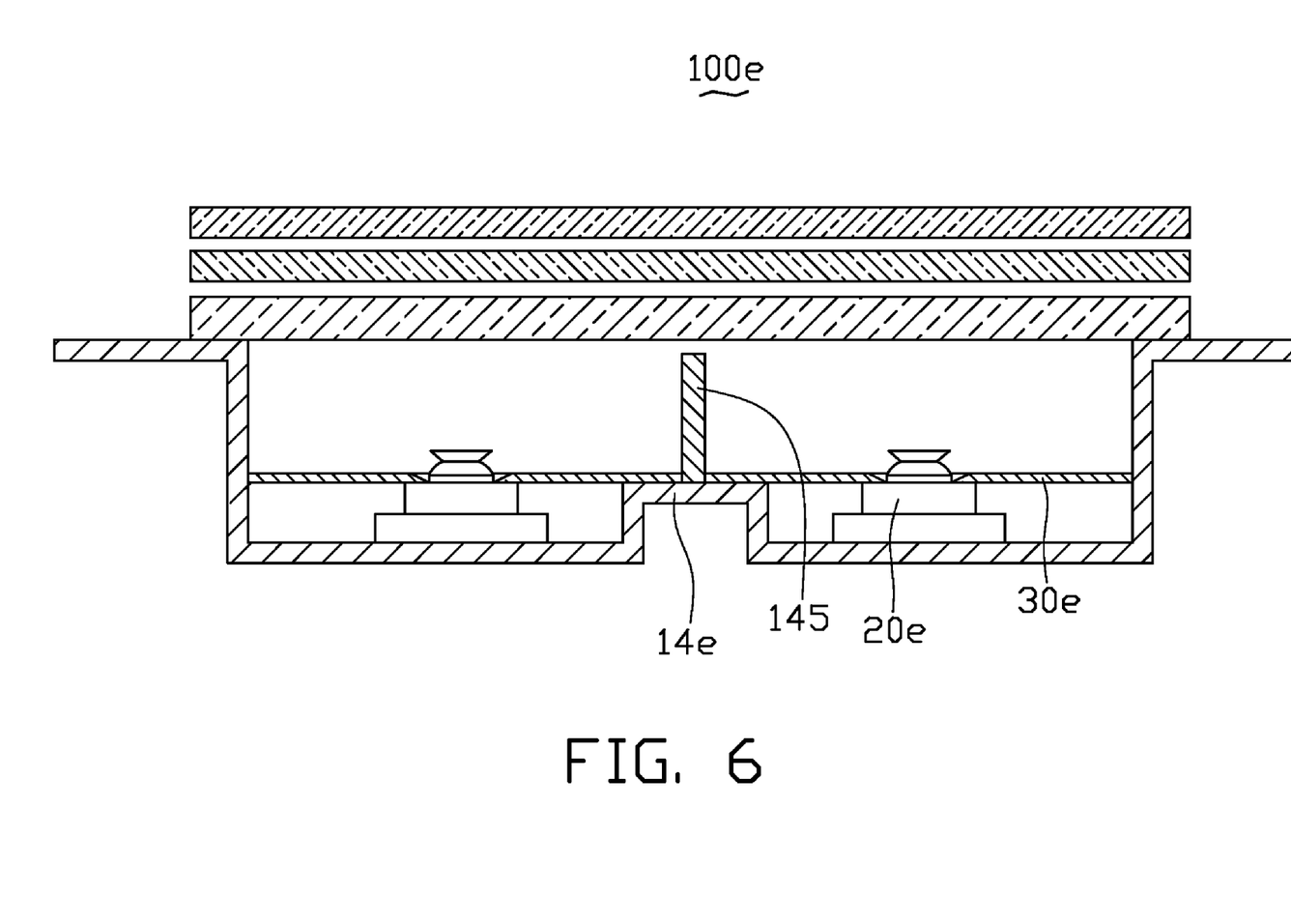
FIG. 6 is a side cross-sectional view of a backlight module in accordance with a sixth embodiment of the present invention.

Referring to FIG. 6, a backlight module 100e according to a sixth embodiment of the present invention is shown. The backlight module 100e includes a platform support 14e and a plurality of reflective sheets 30e. The platform support 14e is configured for supporting the reflective sheets 30e. The backlight module 100e is similar in principle to the backlight module 100 described above, except that the backlight module 100e includes the plurality of reflective sheets 30e. In the illustrated embodiment, the backlight module 100e includes two reflective sheets 30e, and the reflective sheets 30e are supported on opposite sides of the platform support 14e respectively. The backlight module 100e further includes at least one reflective divider 145. In the illustrated embodiment, the backlight module 100e includes one reflective divider 145 between the reflective sheets 30e. The reflective divider 145 is located on the platform support 14e. The reflective divider 145 connects with the reflective sheets 30e and separates two adjacent light sources 20e, in order to increase a reflective area of light beams produced by the light sources 20e. Thereby, uniformity of light beams emitted by the backlight module 100e can be improved.

Figure 7:
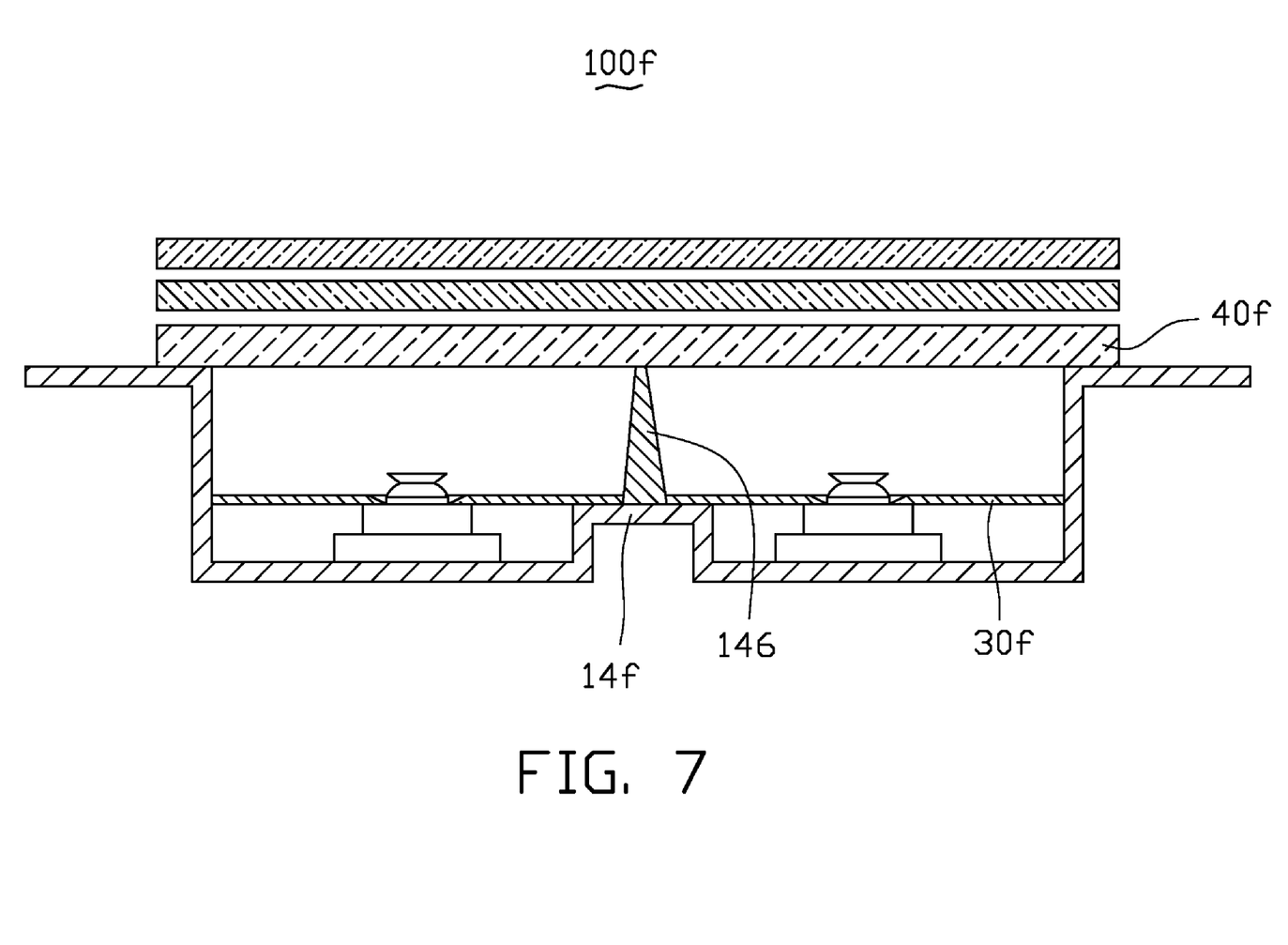
FIG. 7 is a side cross-sectional view of a backlight module in accordance with a seventh embodiment of the present invention.

Referring to FIG. 7, a backlight module 100f according to a seventh embodiment of the present invention is shown. The backlight module 100f includes a platform support 14f and a reflective sheet 30f. The platform support 14f is configured for supporting the reflective sheet 30f. The backlight module 100f is similar in principle to the backlight module 100e described above, except that the backlight module 100f further includes at least one optical sheet support 146. In the illustrated embodiment, the backlight module 100f includes a single optical sheet support 146. The optical sheet support 146 is located on the platform support 14f and abuts against a first optical sheet 40f, thereby preventing the first optical sheet 40f from deforming. Thus the first optical sheet 40f can reliably continue to facilitate uniform emission of light beams, and the optical performance of the backlight module 100*f* can be maintained accordingly.

Figure 8:
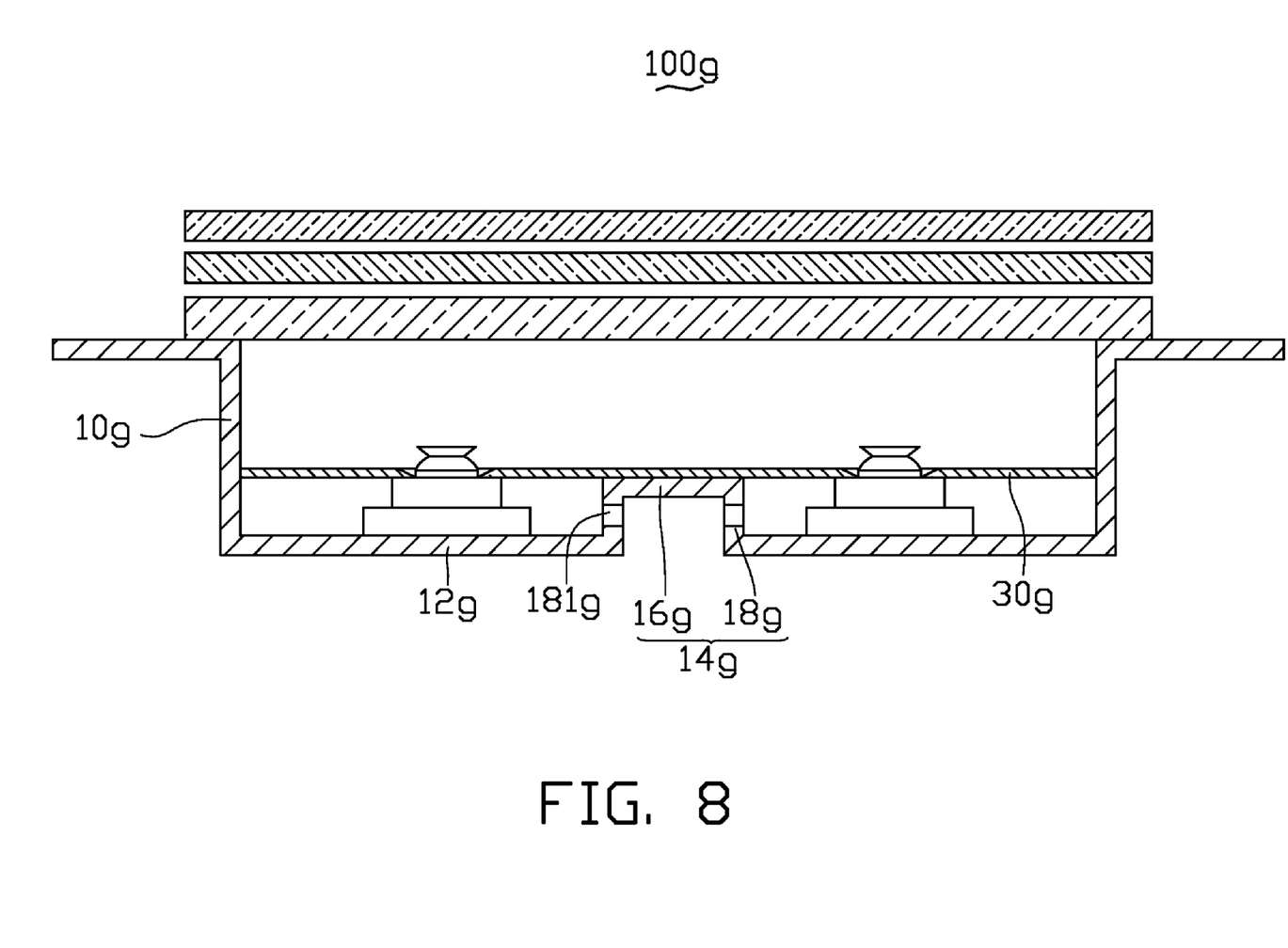
FIG. 8 is a side cross-sectional view of a backlight module in accordance with an eighth embodiment of the present invention.

Referring to FIG. 8, a backlight module 100*g* according to an eighth embodiment of the present invention is shown. The backlight module 100*g* includes a housing 10*g* and a reflective sheet 30*g*. The housing 10*g* includes a bottom plate 12*g*, and a platform support 14*g* extending out from the bottom plate 12*g* towards a top opening of the housing 10*g*. The platform support 14*g* includes a ceiling 16*g* and two sidewalls 18*g*. The ceiling 16*g* of the platform support 14*g* is configured for supporting the reflective sheet 30*g*. The backlight module 100*g* is similar in principle to the backlight module 100 described above, except that each sidewall 18*g* of the backlight module 100*g* defines at least one heat venting hole 181*g*, thereby increasing a heat dissipating performance of the backlight module 100*g*.

Figure 9:
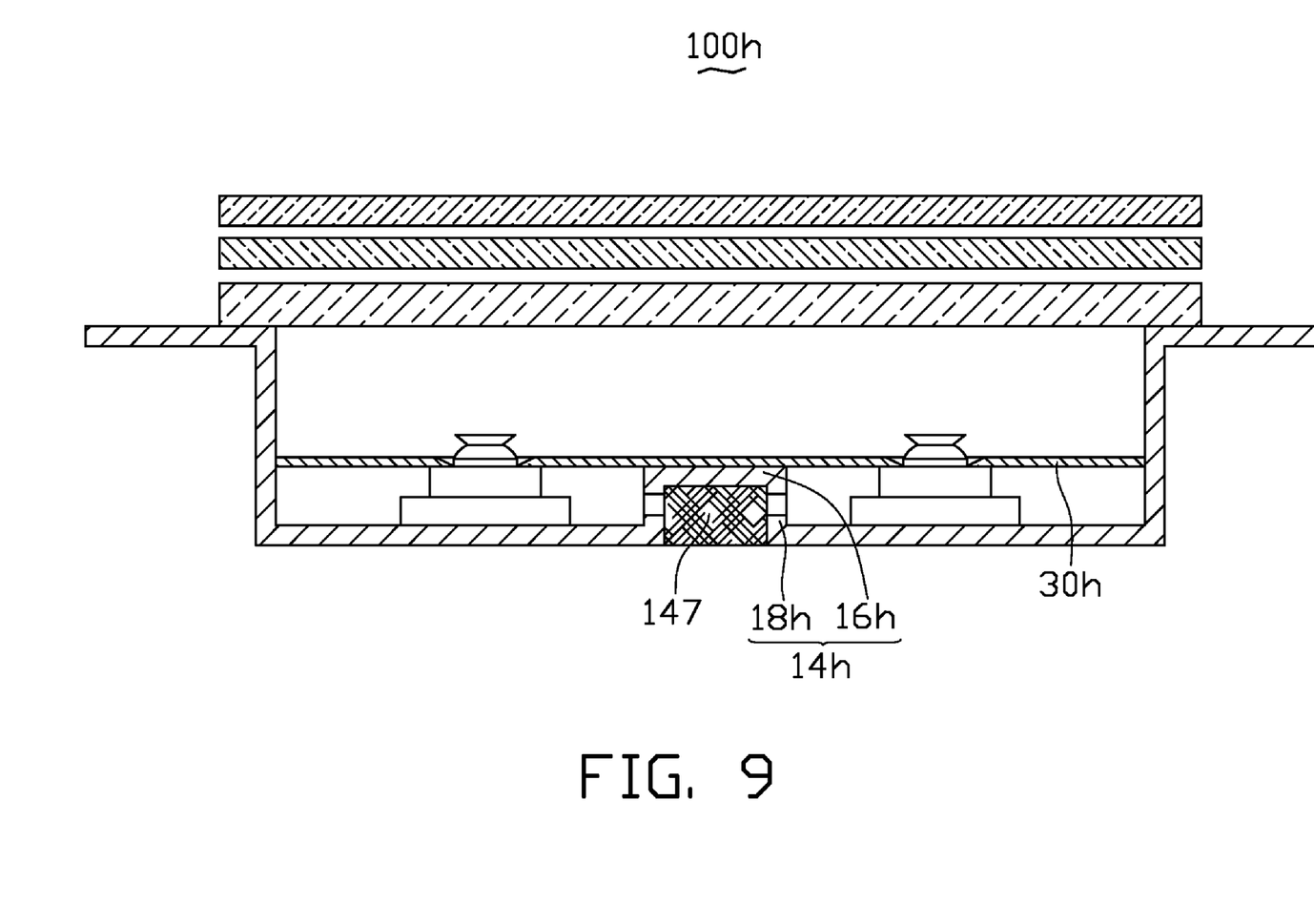
FIG. 9 is a side cross-sectional view of a backlight module in accordance with a ninth embodiment of the present invention.

Referring to FIG. 9, a backlight module 100*h* according to a ninth embodiment of the present invention is shown. The backlight module 100*h* includes a platform support 14*h* and a reflective sheet 30*h*. The platform support 14*h* includes a ceiling 16*h* and two sidewalls 18*h*. The ceiling 16*h* of the platform support 14*h* is configured for supporting the reflective sheet 30*h*. The backlight module 100*h* is similar in principle to the backlight module 100*g* described above, except that the backlight module 100*h* further includes a dust filtering member 147. The dust filtering member 147 is received in a space defined between the ceiling 16*h* and two sidewalls 18*h* of the platform support 14*h*. Thereby, dust is prevented from entering an interior of the backlight module 100*g*.

In alternative embodiments, the reflective sheet 30 can be latched with the platform support 14 of the housing 10 by any other suitable fixing means. In the above-described sixth, seventh, eighth and ninth embodiments, the reflective sheet or sheets may be secured with the platform support of the housing by securing means such as the securing means of the above-described second, third, fourth or fifth embodiments.

In the above-described embodiments of a backlight module, the platform support of the housing supports the reflective sheet. Because the platform support is formed as a part of the housing, there is no need for an extra support member to support the reflective sheet. This means the backlight module can have a reduced weight and reduced cost. In addition, a latching mechanism provided at the platform support can secure the reflective sheet with the platform support. Furthermore, the platform support can have the additional function of providing support for the reflective divider 145 and/or the optical sheet support 146. When the platform support supports the optical sheet support 146, the first optical sheet can reliably continue to facilitate uniform emission of light beams, and the optical performance of the backlight module can be maintained accordingly.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A direct type backlight module, comprising:
   a housing having a bottom plate and at least one platform support extending from the bottom plate towards an interior of the housing, the at least one platform support comprising a ceiling and two sidewalls, and each sidewall extending from the bottom plate;
   a reflective sheet supported by the at least one platform support, the reflective sheet defining a plurality of through holes;
   a plurality of point light sources arranged in the housing corresponding to the through holes of the reflective sheet, each point light source including a base portion and a light emitting portion, the base portion being secured at the bottom plate of the housing, and the light emitting portion protruding through a corresponding one of the through holes; and
   a dust filtering member received in a space defined by the ceiling and the two sidewalls of the at least one platform support.

2. The direct type backlight module as claimed in claim 1, wherein each sidewall defines at least one heat venting hole.

3. The direct type backlight module as claimed in claim 1, wherein the reflective sheet is secured with the at least one platform support of the housing by at least one of a piece of double-sided adhesive tape, a solid adhesive, and a glue.

4. The direct type backlight module as claimed in claim 1, wherein the reflective sheet is secured with the at least one platform support of the housing by a hook.

5. The direct type backlight module as claimed in claim 1, wherein the reflective sheet is oriented on and secured to the at least one platform support of the housing by a pin.

6. The direct type backlight module as claimed in claim 1, wherein the reflective sheet is secured with the at least one platform support of the housing by a fastener.

7. The direct type backlight module as claimed in claim 1, further comprising at least one reflective divider located on the at least one platform support, the at least one reflective divider configured to divide the housing into at least two spaces.

8. The direct type backlight module as claimed in claim 1, further comprising an optical sheet arranged above the point light sources.

9. The direct type backlight module as claimed in claim 8, further comprising at least one optical sheet support located on the at least one platform support and supportively abutting the optical sheet.

\* \* \* \* \*